US012622430B2

(12) United States Patent
Flowers et al.

(10) Patent No.: US 12,622,430 B2
(45) Date of Patent: May 12, 2026

(54) PROGRAMMABLE WATERFOWL DECOY AND METHOD THEREFOR

(71) Applicants: Fletcher Flowers, Yemassee, SC (US); Andrew Godowns, Yemassee, SC (US)

(72) Inventors: Fletcher Flowers, Yemassee, SC (US); Andrew Godowns, Yemassee, SC (US)

( * ) Notice: Subject to any disclaimer, the term of this patent is extended or adjusted under 35 U.S.C. 154(b) by 24 days.

(21) Appl. No.: 18/896,127

(22) Filed: Sep. 25, 2024

(65) Prior Publication Data

US 2026/0083118 A1      Mar. 26, 2026

(51) Int. Cl.

| | |
|---|---|
| *A01M 31/06* | (2006.01) |
| *B60L 15/20* | (2006.01) |
| *B60L 53/16* | (2019.01) |
| *B60L 53/80* | (2019.01) |
| *B63H 21/17* | (2006.01) |
| *B63H 21/21* | (2006.01) |

(52) U.S. Cl.
CPC ............. *A01M 31/06* (2013.01); *B60L 15/20* (2013.01); *B60L 53/16* (2019.02); *B60L 53/80* (2019.02); *B63H 21/17* (2013.01); *B63H 21/21* (2013.01); *B60L 2200/32* (2013.01)

(58) Field of Classification Search
CPC ...................................................... A01M 31/06
See application file for complete search history.

(56) References Cited

U.S. PATENT DOCUMENTS

| | | | |
|---|---|---|---|
| D404,791 S | 1/1999 | Swiecki | |
| 10,212,929 B2 | 2/2019 | Janzen, Jr. | |
| 10,292,380 B1* | 5/2019 | DeLoach, III | ........ H04W 4/024 |
| 10,321,674 B1 | 6/2019 | Goodwin | |
| 2009/0188148 A1* | 7/2009 | Orris | ..................... A01M 31/06 |
| | | | 43/2 |
| 2011/0067289 A1 | 3/2011 | Lane | |
| 2017/0231218 A1 | 8/2017 | Turner | |
| 2017/0332621 A1 | 11/2017 | Macias | |
| 2019/0246627 A1* | 8/2019 | Frentz | .................. A01M 31/06 |
| 2019/0250602 A1* | 8/2019 | DeLoach, III | ........ H02J 7/0042 |
| 2020/0100846 A1 | 4/2020 | Huang | |
| 2021/0141379 A1* | 5/2021 | DeLoach, III | ......... G08C 17/02 |
| 2022/0147066 A1 | 5/2022 | Choi | |
| 2023/0232819 A1* | 7/2023 | Bruns | ................... A01M 31/06 |
| | | | 43/3 |
| 2024/0114892 A1* | 4/2024 | Bruns | .................... A63H 23/10 |

FOREIGN PATENT DOCUMENTS

| | | |
|---|---|---|
| CA | 2391478 | 12/2003 |

* cited by examiner

*Primary Examiner* — Christopher P Ellis

(57) ABSTRACT

A programmable waterfowl decoy includes a waterfowl-shaped body, a propulsion assembly, and a programmable control system. The waterfowl-shaped body includes buoyant material. The propulsion assembly is mounted at a bottom portion of the waterfowl-shaped body and designed to propel the waterfowl decoy through water. The programmable control system is positioned in the waterfowl-shaped body and is operatively connected to the propulsion assembly to automatically control the movement of the waterfowl decoy in water according to a user-selected program.

20 Claims, 6 Drawing Sheets

PROGRAMMABLE WATERFOWL DECOY AND METHOD THEREFOR

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hunting decoys and accessories and more particularly pertains to a new programmable waterfowl decoy for providing hunters with a self-propelled waterfowl decoy that automatically moves in water according to a user-selected program designed to mimic the natural movements of waterfowl, such as ducks.

(2) Description of Related Art Including Information Disclosed Under 37 CFR 1.97 and 1.98

The prior art relates to hunting decoys and accessories. The prior art, as best understood, does not disclose a programmable waterfowl decoy includes a waterfowl-shaped body, a propulsion assembly, and a programmable control system, wherein the programmable control system automatically controls the movement of the waterfowl decoy in water according to a user-selected program.

BRIEF SUMMARY OF THE INVENTION

An embodiment of the disclosure meets the needs presented above in a programmable waterfowl decoy generally comprising a waterfowl-shaped body, a propulsion assembly, and a programmable control system. The waterfowl-shaped body includes buoyant material. The propulsion assembly is mounted at a bottom portion of the waterfowl-shaped body and designed to propel the waterfowl decoy through water. The programmable control system is positioned in the waterfowl-shaped body and is operatively connected to the propulsion assembly to automatically control the movement of the waterfowl decoy in water according to a user-selected program.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
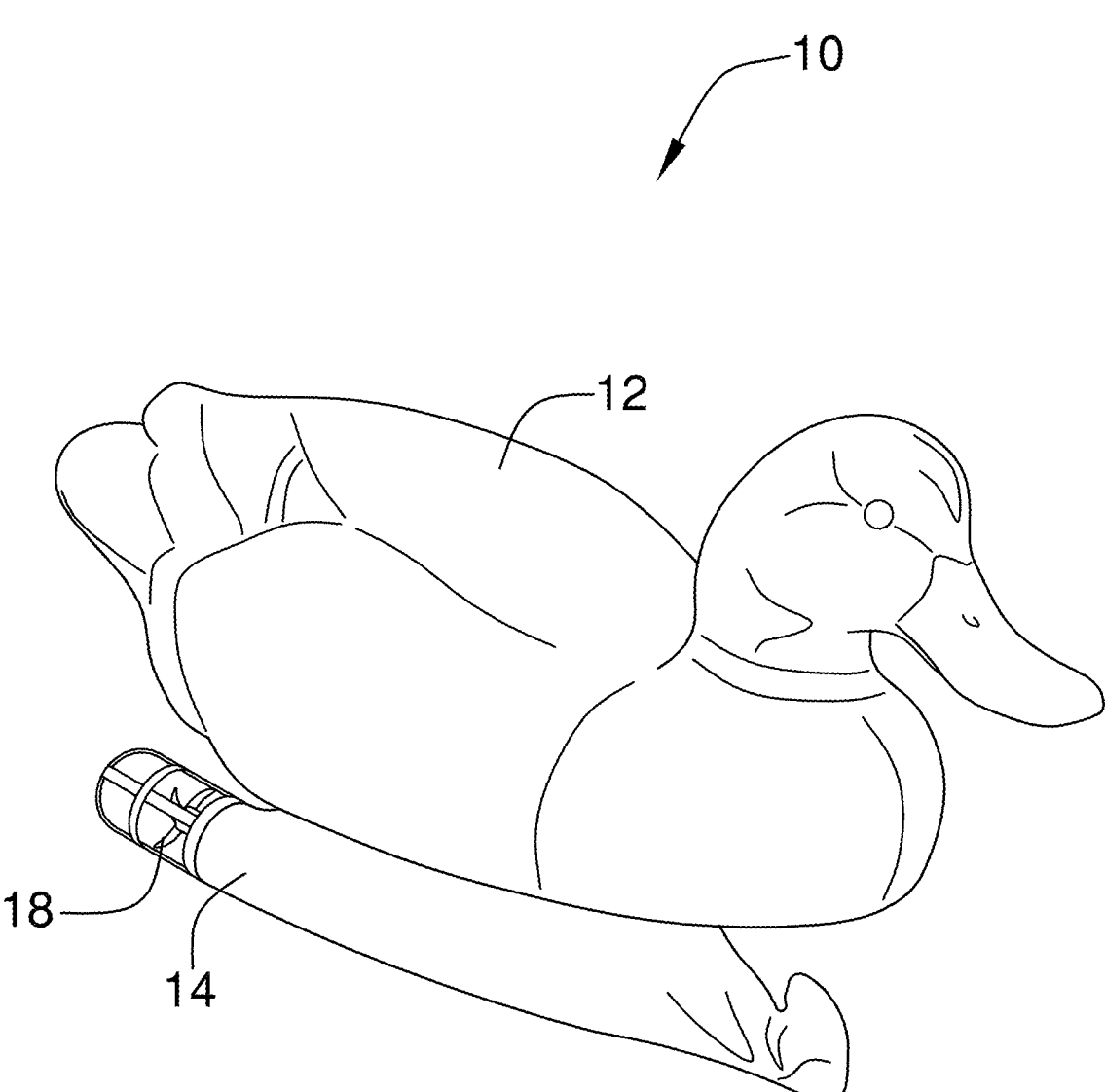
FIG. 1 is a front perspective view of a programmable waterfowl decoy according to an embodiment of the disclosure.
Figure 2:
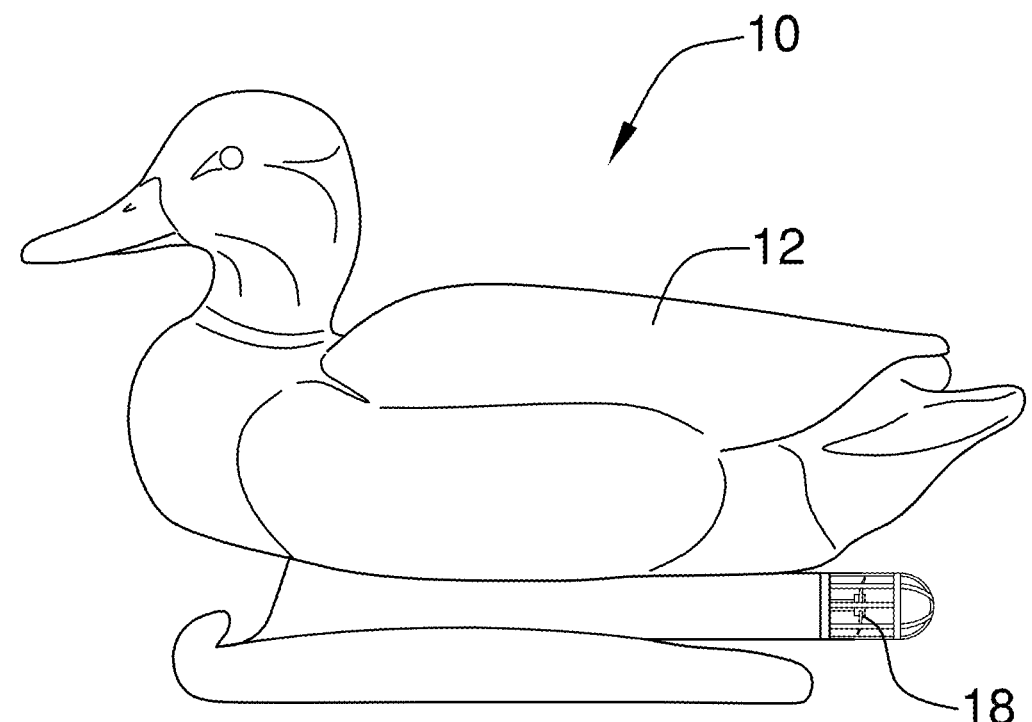
FIG. 2 is a side view of an embodiment of the disclosure.
Figure 3:
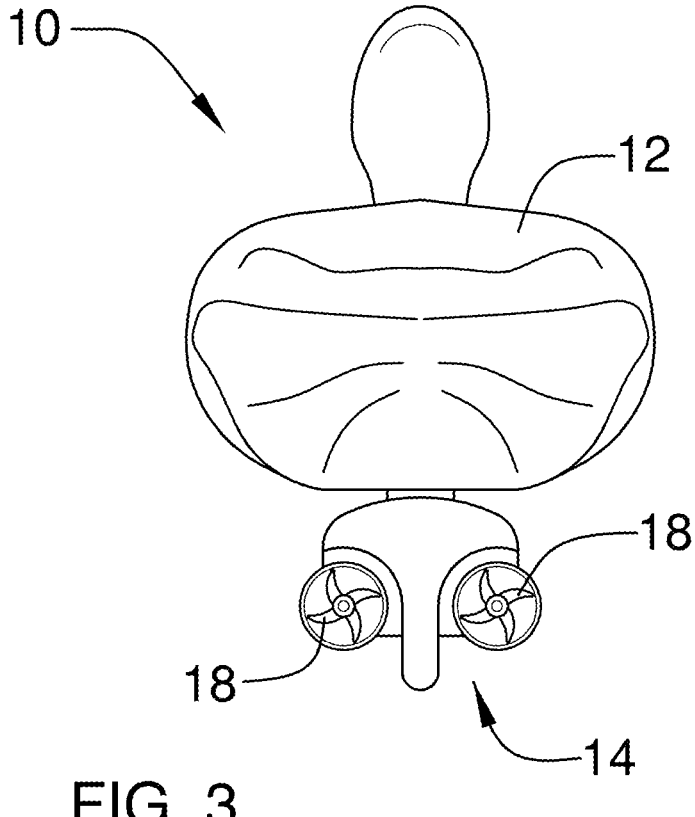
FIG. 3 is a rear view of an embodiment of the disclosure.

With reference now to the drawings, and in particular to FIGS. 1 through 7 thereof, a new programmable waterfowl decoy embodying the principles and concepts of an embodiment of the disclosure and generally designated by the reference numeral 10 will be described.

As best illustrated in FIGS. 1 through 7, the programmable waterfowl decoy 10 generally comprises a waterfowl-shaped body 12, a propulsion assembly 14, and a programmable control system 16. The waterfowl-shaped body 12 includes buoyant material. The propulsion assembly 14 is mounted at a bottom portion of the shaped body 12 and designed to propel the waterfowl decoy 10 through water. The programmable control system 16 is positioned in the waterfowl-shaped body 12 and is operatively connected to the propulsion assembly 14 to automatically control the movement of the waterfowl decoy 10 in water according to a user-selected program. In the exemplary embodiment shown in the figures, the waterfowl-shaped body 12 is shaped to resemble a duck, though other waterfowl such as geese could be represented.

Figure 4:
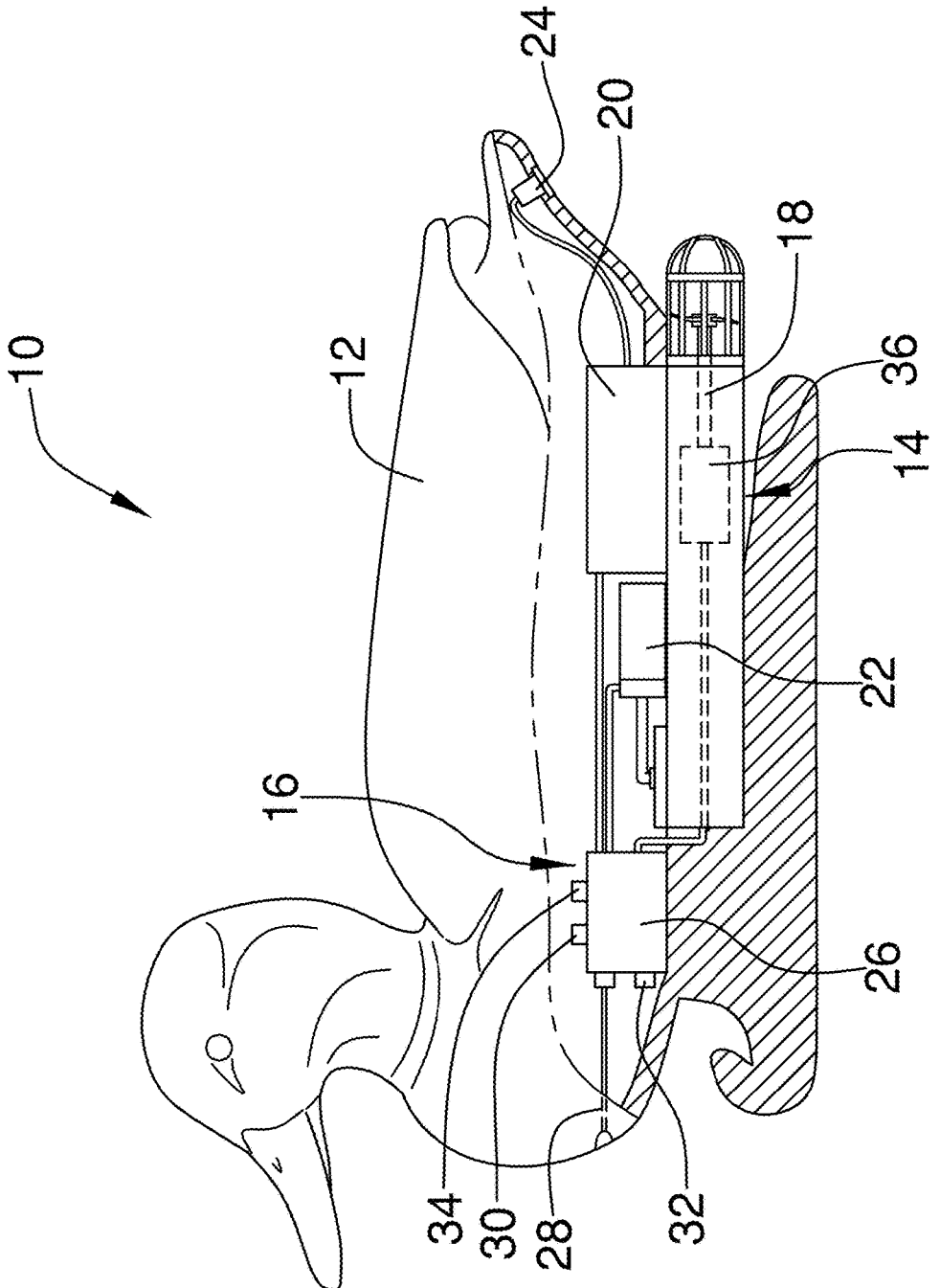
FIG. 4 is a side cross-sectional view of an embodiment of the disclosure.
Figure 5:
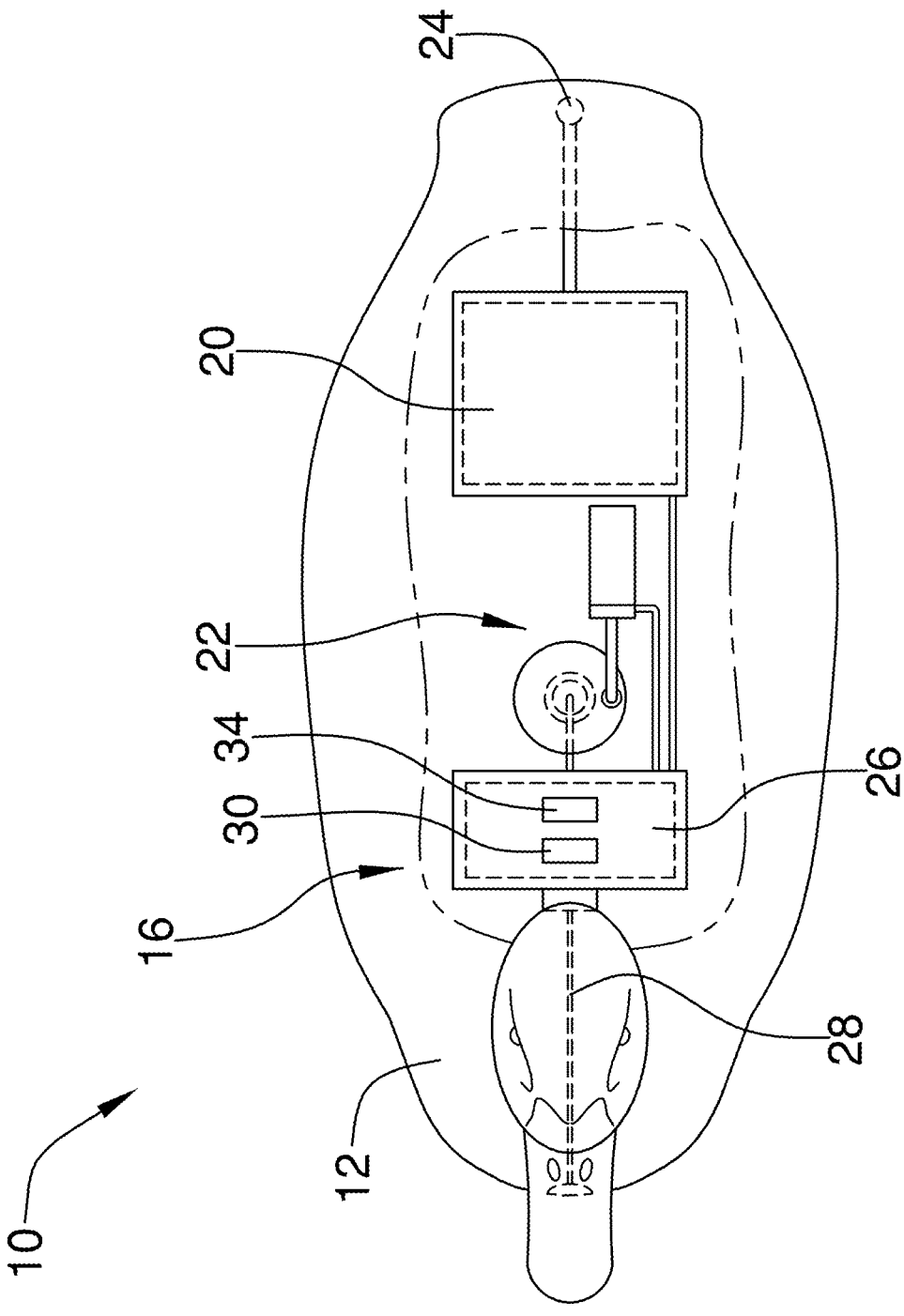
FIG. 5 is a top view of an embodiment of the disclosure.

As seen in FIGS. 4 and 5, the propulsion assembly 14 includes at least one motorized propellor 18, a battery unit 20, and a steering assembly 22 operatively connected to the programmable control system 16. The propellor 18 includes a motor 36, which is operatively connected to the control system 16 for operation of the propellor 18. The battery unit 20 is rechargeable via a charging port 24 positioned in the waterfowl-shaped body 12. In at least one possible embodiment, the battery unit 20 is removable to permit exchanging of a discharged battery unit 20 with a charged battery unit 20.

Figure 6:
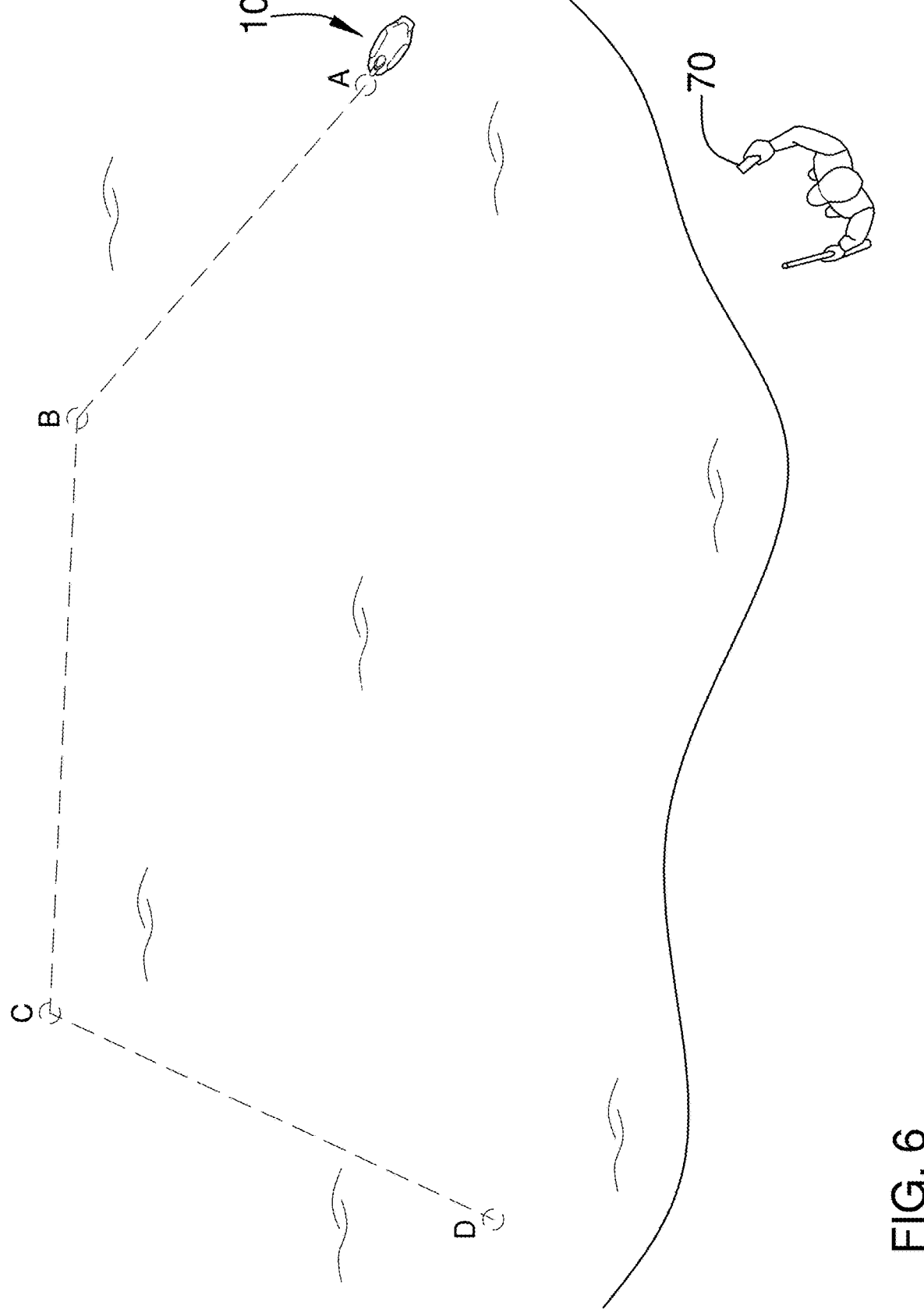
FIG. 6 is a top view of an embodiment of the disclosure in use.
Figure 7:
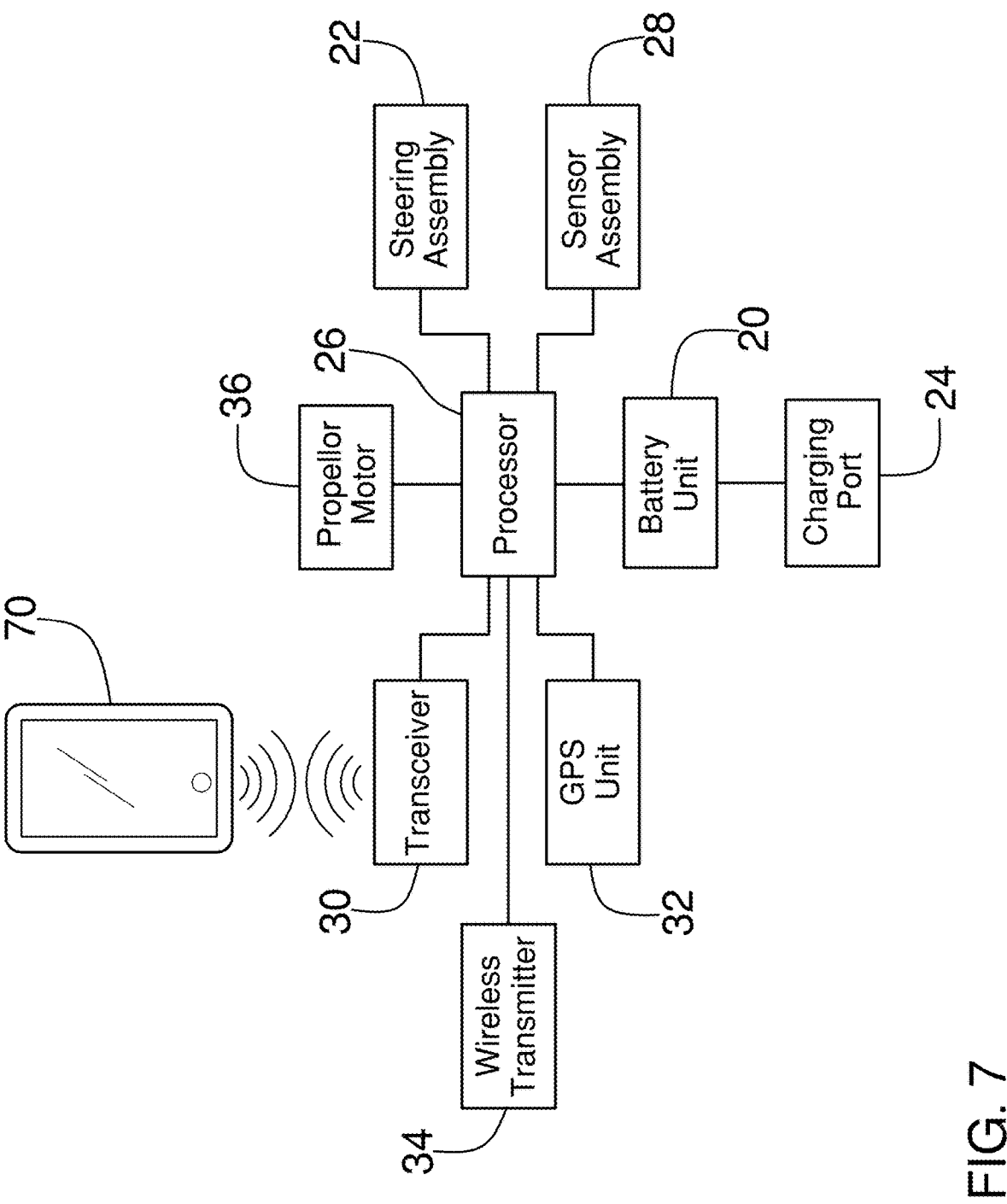
FIG. 7 is a block diagram of an embodiment of the disclosure.

The control system 16 includes a processor 26 designed to store operational information and programs. The control system 16 also includes a sensor assembly 28 operatively connected to the processor 26 and designed to detect obstructions in the path of movement of the waterfowl decoy 10. The sensor assembly 28 could be ultrasonic, photoelectric, or other suitable sensor for detecting objects. The control system 16 includes a transceiver 30 operatively connected to the processor 26 and designed to receive operational information wirelessly from a computer application on an electronic device 70, as represented in FIGS. 6 and 7. The electronic device 70 could be a personal computer or a mobile device, such as a smartphone or tablet computer. The control system 16 also can include a GPS unit 32 operatively connected to the processor 26 and designed to provide location information for use in controlling the movement of the waterfowl decoy 10 in water.

In general, the programmable waterfowl decoy 10 can be used by hunters to mimic the natural movements of waterfowl, such as ducks. The hunter places the waterfowl decoy 10 in a body of water. Before or after doing so, the hunter can select a program of movement of the waterfowl decoy 10 that mimics natural movement of waterfowl in water. The control system 16 then activates the propulsion assembly 14 and automatically controls the movement of the waterfowl decoy 10 in the water according to the user-selected program. As mentioned above, the hunter can input movement information wirelessly via a computer application on an electronic device 70.

The hunter has a variety of options in programming the waterfowl decoy 10. The hunter can program the waterfowl decoy 10 to switch between deactivating and activating the propulsion assembly 14 to thereby switch between free floating and movement of the waterfowl decoy 10. Since waterfowl often simply float on water without actively moving, it is advantageous to be able to program the waterfowl decoy 10 to have periods where the propulsion assembly 14 is deactivated such that the waterfowl decoy 10 simply floats freely on the water. The hunter can select a movement path from a pre-set group of movement paths, or the hunter can create a movement path by inputting at least one of: movement distances, directions, and duration. FIG. 6 shows an example of a movement path marked off by waypoints A, B, C, and D. This movement path can be either a pre-set movement path available to be selected via the computer application, or it could be a custom movement path created by the hunter by inputting the information necessary to create the particular path. As mentioned above, the operation of the waterfowl decoy 10 in this scenario could include a combination of movement and periods of free floating, such as possibly at each waypoint.

The hunter could also select a restricted movement zone in which the waterfowl decoy 10 may move freely or according to a movement program but not beyond the perimeter of the movement zone based on GPS location. For example, the body of water may be quite large, so the hunter may wish to restrict movement of the waterfowl decoy 10 to a limited area to prevent the waterfowl decoy 10 from traveling or drifting too far and possibly becoming lost. The hunter could either select the restricted area from a list or by inputting selected values, such as latitude and longitude coordinates, length and width, or points on a map. The hunter could then program the waterfowl decoy 10 to move freely and randomly within the restricted movement zone or in accordance with a movement path. If and when the waterfowl decoy 10 encounters the perimeter of the restricted movement zone, according to GPS location information, the waterfowl decoy 10 will execute a turning or reverse movement to avoid traveling beyond the perimeter, even if such movement alters the selected movement path.

The waterfowl decoy 10 also can detect obstructions obstructing the movement of the waterfowl decoy 10 using the sensor assembly 28 mentioned above. When the sensor assembly 28 senses an obstruction, the control system 16 can automatically adjust the movement of the waterfowl decoy 10 to avoid the obstruction and then resume movement in accordance with the program of movement.

The waterfowl decoy 10 can also be programmed to automatically move itself to a retrieval area, such as near the shore or a hunting blind or stand, upon completion of the program of movement or upon a detection of a low battery charge or operational malfunction. This automatic return helps minimize loss of the waterfowl decoy 10 and facilitate retrieval.

In one possible embodiment, a plurality of the waterfowl decoys 10 can be simultaneously controlled in accordance with a synchronized movement program to mimic the natural movement of a flock of waterfowl in water. In addition, each of the waterfowl decoys 10 can include a wireless transmitter 34 to permit the wireless relaying of movement information from one waterfowl decoy 10 to another, which thereby can extend the wireless transmission range of movement information. For example, if the wireless signal from an electronic device 70 can only reach a certain distance, each waterfowl decoy 10 can act as a relay to relay that wireless signal over a greater distance than would be possible using only the electronic device 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A programmable waterfowl decoy comprising:
   a waterfowl-shaped body comprising buoyant material;
   a propulsion assembly mounted at a bottom portion of said waterfowl-shaped body and configured to propel the waterfowl decoy through water; and
   a programmable control system disposed in said waterfowl-shaped body and operatively connected to said propulsion assembly to automatically control the movement of the waterfowl decoy in water according to a user-selected program;

the propulsion assembly including a pair of motorized propellors, said waterfowl-shaped body having a base section extending below an upper section, said upper section being shaped to resemble a waterfowl, said base section extending downwardly from said upper section between said pair of motorized propellors, a bottom-most edge of said base section being vertically spaced beneath said pair of motorized propellors.

2. The programmable waterfowl decoy of claim 1, wherein said upper section of said waterfowl-shaped body is shaped to resemble a duck.

3. The programmable waterfowl decoy of claim 1, wherein the propulsion assembly comprises, a battery unit and a steering assembly operatively connected to said programmable control system.

4. The programmable waterfowl decoy of claim 3, wherein said battery unit is rechargeable via a charging port disposed in said waterfowl-shaped body.

5. The programmable waterfowl decoy of claim 3, wherein said battery unit is removable to permit exchanging of a discharged battery unit with a charged battery unit.

6. The programmable waterfowl decoy of claim 1, wherein said control system comprises a processor configured to store operational information and programs.

7. The programmable waterfowl decoy of claim 6, wherein said control system comprises a sensor assembly operatively connected to said processor and configured to detect obstructions in the path of movement of the waterfowl decoy.

8. The programmable waterfowl decoy of claim 6, wherein said control system comprises a transceiver operatively connected to said processor and configured to receive operational information wirelessly from a computer application on an electronic device.

9. The programmable waterfowl decoy of claim 6, wherein said control system comprises a GPS unit operatively connected to said processor and configured to provide location information for use in controlling the movement of the waterfowl decoy in water.

10. A method of using the programmable waterfowl decoy of claim 1, comprising the steps of:

placing the waterfowl decoy in a body of water;

selecting a program of movement of the waterfowl decoy that mimics natural movement of waterfowl in water; and activating the propulsion assembly and automatically controlling the movement of the waterfowl decoy in water with said programmable control system according to the user-selected program.

11. The method of claim 10, wherein said step of automatically controlling the movement of the waterfowl decoy comprises switching between deactivating and activating the propulsion assembly and thereby switching between free floating and movement of the waterfowl decoy.

12. The method of claim 10, wherein said step of selecting a program of movement comprises inputting movement information wirelessly via a computer application on an electronic device.

13. The method of claim 12, wherein said step of inputting movement information comprises selecting a movement path from a pre-set group of movement paths.

14. The method of claim 12, wherein said step of inputting movement information comprises creating a movement path by inputting at least one of: movement distances, directions, and duration.

15. The method of claim 12, wherein said step of inputting movement information comprises selecting a restricted movement zone in which the waterfowl decoy may move freely or according to a movement program but not beyond the perimeter of the movement zone based on GPS location.

16. The method of claim 10, wherein said step of automatically controlling the movement of the waterfowl decoy comprises detecting obstructions obstructing the movement of the waterfowl decoy and automatically adjusting the movement of the waterfowl decoy to avoid the obstructions and resume movement in accordance with the program of movement.

17. The method of claim 10, wherein said step of automatically controlling the movement of the waterfowl decoy comprises automatically moving the waterfowl decoy to a retrieval area upon completion of the program of movement or upon a detection of a low battery charge or operational malfunction.

18. The method of claim 10, wherein said method further comprises automatically controlling the movement of a plurality of the waterfowl decoys to mimic the natural movement of a flock of waterfowl in water.

19. The method of claim 18, wherein each of the waterfowl decoys comprises a wireless transmitter and said method further comprises wirelessly relaying movement information from one waterfowl decoy to another and thereby extending the wireless transmission range of movement information.

20. A programmable waterfowl decoy comprising:

a waterfowl-shaped body comprising buoyant material, wherein said waterfowl-shaped body is shaped to resemble a duck;

a propulsion assembly mounted at a bottom portion of said waterfowl-shaped body and configured to propel the waterfowl decoy through water, wherein:

the propulsion assembly comprises a pair of motorized propellors, a battery unit, and a steering assembly operatively connected to said programmable control system, said battery unit is rechargeable via a charging port disposed in said waterfowl-shaped body, said battery unit is removable to permit exchanging of a discharged battery unit with a charged battery unit;

said waterfowl-shaped body having a base section extending below an upper section, said upper section being shaped to resemble a waterfowl, said base section extending downwardly from said upper section between said pair of motorized propellors, a bottom-most edge of said base section being vertically spaced beneath said pair of motorized propellors; and a programmable control system disposed in said waterfowl-shaped body and operatively connected to said propulsion assembly to automatically control the movement of the waterfowl decoy in water according to a user-selected program, wherein:

said control system comprises a processor configured to store operational information and programs, said control system comprises a sensor assembly operatively connected to said processor and configured to detect obstructions in the path of movement of the waterfowl decoy, said control system comprises a transceiver operatively connected to said processor and configured to receive operational information wirelessly from a computer application on an electronic device, said control system comprises a GPS unit operatively connected to said processor and configured to provide location information for use in controlling the movement of the waterfowl decoy in water.

\* \* \* \* \*